A. K. RIDER.
FRICTION DEVICES FOR CONTROLLING MOTION.

No. 192,012. Patented June 12, 1877.

UNITED STATES PATENT OFFICE.

ALEXANDER K. RIDER, OF WALDEN, NEW YORK.

IMPROVEMENT IN FRICTION DEVICES FOR CONTROLLING MOTION.

Specification forming part of Letters Patent No. 192,012, dated June 12, 1877; application filed November 23, 1876.

*To all whom it may concern:*

Be it known that I, ALEXANDER K. RIDER, of Walden, in the county of Orange and State of New York, have invented certain new and useful Improvements in Friction-Couplings; and I do hereby declare that the following is a full, clear, and exact description of the same, reference being had to the accompanying drawing, which forms part of this specification.

This invention relates to friction clutches or couplings for shafts and other rotating bodies.

The invention consists in a combination of a spiral or helical friction-coil, fastened at its one end to a rotating shaft or carrier, but free at its opposite end, a friction box or hub, with which said coil is made to engage and disengage, and which is free to rotate independently of the coil, and means having a positive and independent action for putting the free end of the coil into or out of contact with the friction-box or its equivalent, accordingly as it is required to engage or disengage the coupling, whereby the spiral coil, when engaged, has an accumulating action, and, when disengaged by the positive means for the purpose, is free to rotate in either direction without friction on or contact with the box or other portion of the coupling.

The invention also consists in certain combinations of devices with the spiral coil, and with the friction-box or other portion of the coupling with which said coil engages, for effecting or facilitating the engagement and disengagement of the coil.

Figure 1:
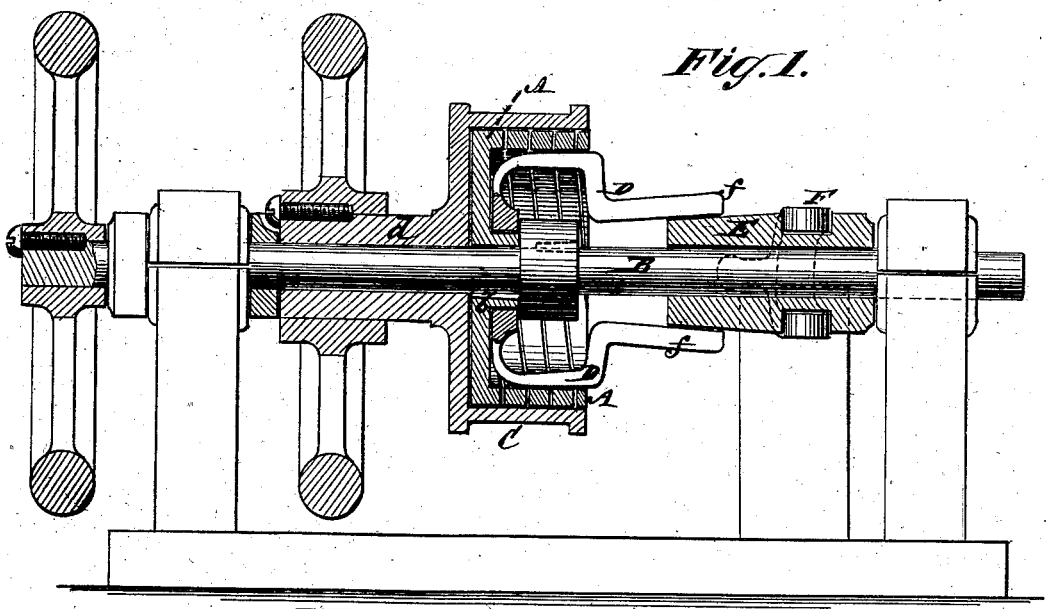
Figure 2:
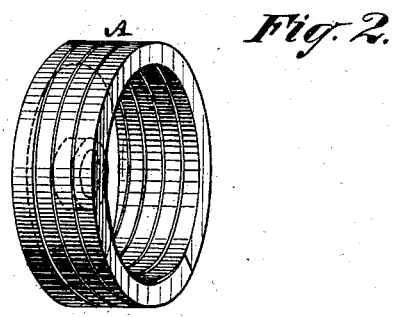

Figure 1 represents a vertical longitudinal section of a friction-clutch mechanism having my improved coupling applied, and Fig. 2 a view in perspective of the friction-coil detached.

A is the friction-coil, which has an accumulating action. This coil is securely keyed or fastened at *b* onto a main or driving shaft, B, and is arranged to fit easily or loosely within a friction-box, C, which forms one part of the coupling, and which turns loosely on the shaft B.

In constructing and applying the friction-coil A it is first formed as a plain hollow pulley, closed on its one side only. Said pulley is then fitted to the shaft B, and a narrow spiral cut afterward made entirely through and around its cylindrical body, so as to form, preferably, a single spiral thread, having any number of turns. Three or four turns, however, will be generally sufficient.

The box or case C, in which the coil A is closely but freely fitted, has an extended hub, *d*, that fits loosely on the shaft B to give said box its requisite central position. It is entirely loose from the shaft B when the coupling is not in gear, and is driven by the friction-coil when in action.

D is an expanding-yoke, fitted to occupy a loose concentric relation with the shaft B within the friction-coil A. It is made sufficiently thin at its inner portion to be capable of slightly yielding or springing outwardly against the outermost turn at the free end of the coil A, and is formed with outer ends or projections *f*, extending beyond the coil, and resting on an expanding-cone, E.

When not in action the expanding-yoke D springs inward, so as to be entirely out of contact with the coil A; but when put into action it presses on the outer turn of the coil, but not on any of the other turns thereof. It is put in and out of action by sliding the expanding-cone E forward or backward on the shaft B by means of a shifting-lever, F.

To engage the coupling it is only necessary to advance the expanding-cone E into the yoke D, which, spreading sufficiently to engage the outer turn of the coil A with the box C, causes the resistance thereby produced, and which is opposed to the tangential movement of the first turn, to successively tighten each turn of the coil till the whole number of turns in the coil from the point of first contact to the fast end thereof are firmly held against the box C by the accumulated friction of all the turns.

When it is required to disengage the coupling the expanding-yoke E is slid back so as to release the yoke D from pressing outward on the outer turn of the coil, and so relieve the latter from pressure on the box or other friction portion of the coupling C.

To give an accumulating action to the coil A when engaged, the shaft B rotates only in one direction; but when the coil is disengaged, then it and its shaft may rotate either in the same direction or in an opposite one without bearing on the box C, by reason of the independent or positive means which are employed to engage it with and disengage it from the friction-box.

The arrangement of parts as here shown and described provides for the coil engaging, by expansion or increase of its diameter, with the other friction portion of the coupling; but it may be made to engage by contraction of its turns by arranging said coil around the outside of the box, or of a hub which would be the equivalent of the box, instead of within the latter, as shown. The coil also may be variously changed in form; thus, when great compactness is required, it may be of a volute or scroll form, and, instead of being circular, it may be of a polygonal construction to give it a series of short bearings. It may also be composed of more than one piece, if desired. The positive means for engaging and disengaging the coil may also be changed, as, for instance, by substituting toggle-lever or other devices for the expanding-yoke.

I claim—

1. The combination, in a friction-coupling, of a spiral or helical coil, fast at one end to a rotating shaft or carrier, a friction hub or box, and means for positively engaging and disengaging said coil with and from said box or hub, substantially as specified.

2. The expanding-yoke D, in combination with the coil A and the shaft or carrier B, essentially as described.

3. The cone E, in combination with the expanding-yoke D, the coil A, the shaft B, and the friction hub or box C, substantially as specified.

ALEXR. K. RIDER.

Witnesses:
W. G. RUTHERFORD,
GEO. W. STODDARD.